(12) United States Patent
Yan (10) Patent No.: US 11,647,756 B2
(45) Date of Patent: May 16, 2023

(54) ADJUSTABLE TORTILLA MAKER

(71) Applicant: Shenzhen Minxing Technology Co., Ltd., Shenzhen (CN)

(72) Inventor: Qingping Yan, Shenzhen (CN)

(73) Assignee: Shenzhen Minxing Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/723,645

(22) Filed: Apr. 19, 2022

(65) Prior Publication Data

US 2023/0044855 A1   Feb. 9, 2023

Related U.S. Application Data

(63) Continuation of application No. 17/534,382, filed on Nov. 23, 2021, now abandoned.

(30) Foreign Application Priority Data

Aug. 6, 2021   (CN) .......................... 202121832033.4

(51) Int. Cl.
*A21C 11/00* (2006.01)
*A21D 13/42* (2017.01)

(52) U.S. Cl.
CPC ............ *A21C 11/006* (2013.01); *A21D 13/42* (2017.01)

(58) Field of Classification Search
CPC ............................. A21C 11/006; A21C 11/004
See application file for complete search history.

(56) References Cited

U.S. PATENT DOCUMENTS

| | | | | |
|---|---|---|---|---|
| 1,459,976 A | * | 6/1923 | Gore | A21C 11/16 425/409 |
| 1,621,896 A | * | 3/1927 | Peguero | A21C 11/006 425/409 |
| 2,260,780 A | * | 10/1941 | Holly | A21C 11/006 425/89 |
| 2,896,555 A | * | 7/1959 | Marcus | A21C 11/006 425/412 |
| 3,352,258 A | * | 11/1967 | Lassaulx | A21B 5/03 425/89 |
| D255,412 S | * | 6/1980 | Bereza | D15/135 |
| 6,067,897 A | * | 5/2000 | Grieco | A21C 11/004 425/367 |
| 6,205,914 B1 | * | 3/2001 | McCarney | A21C 11/006 99/376 |

(Continued)

*Primary Examiner* — Emmanuel S Luk
(74) *Attorney, Agent, or Firm* — Cooper Legal Group, LLC (57) ABSTRACT

An adjustable tortilla maker comprises a base plate comprising a lower forming surface and a pressing plate comprising an upper forming surface. When the pressing plate is in a pressing state, the lower forming surface is opposite to the upper forming surface. A rotary shaft assembly comprises a pressing plate pin shaft mounted on a rotary shaft seat, and the pressing plate is rotatably connected to the rotary shaft seat through the pressing plate pin shaft. A mounting post is connected to the base plate, and the mounting post extends along a thickness direction of the base plate. The mounting post protrudes from the lower forming surface of the base plate, and the rotary shaft seat is configured to be movably mounted on the mounting post. A locking portion is configured to lock the rotary shaft seat to the mounting post at a predefined position.

16 Claims, 6 Drawing Sheets

(56) References Cited

U.S. PATENT DOCUMENTS

| | | | | |
|---|---|---|---|---|
| 6,242,027 B1* | 6/2001 | Grieco | ............... | A21C 5/00 |
| | | | | 426/503 |
| 6,443,054 B1* | 9/2002 | McCarney | ......... | A21C 11/006 |
| | | | | 425/383 |
| 6,769,898 B1* | 8/2004 | Voyatzakis | ......... | A21C 11/006 |
| | | | | 426/496 |
| 2004/0009256 A1* | 1/2004 | Voyatzakis | ......... | A21C 11/006 |
| | | | | 425/404 |
| 2015/0064301 A1* | 3/2015 | McCarney | ......... | A21C 11/006 |
| | | | | 425/412 |
| 2016/0174577 A1* | 6/2016 | Saldana Garza | .... | A21C 11/006 |
| | | | | 99/450.6 |
| 2017/0105421 A1* | 4/2017 | Saldana | ............. | A21C 9/063 |
| 2017/0347669 A1* | 12/2017 | McCarney | ......... | A21C 11/006 |
| 2018/0206506 A1* | 7/2018 | Saldana | ............. | A21C 9/063 |
| 2019/0282263 A1* | 9/2019 | Kincaid | ............. | A61B 90/11 |
| 2019/0343132 A1* | 11/2019 | Zapata | ............... | A21C 11/02 |
| 2020/0229450 A1* | 7/2020 | Morello | ............. | A21D 13/41 |
| 2020/0315186 A1* | 10/2020 | Miceli | ............... | A21C 11/006 |

\* cited by examiner

ADJUSTABLE TORTILLA MAKER

RELATED APPLICATIONS

This application is a continuation of U.S. patent application Ser. No. 17/534,382, filed on Nov. 23, 2021, which claims priority to Chinese patent application number 202121832033.4, filed on Aug. 6, 2021. U.S. patent application Ser. No. 17/534,382 and Chinese patent application number 202121832033.4 are incorporated herein by reference.

FIELD OF THE DISCLOSURE

The present disclosure relates to the field of food making, and in particular to an adjustable tortilla maker.

BACKGROUND OF THE DISCLOSURE

Existing tortilla makers comprise a base plate, a pressing plate, and a handle. The base plate and the pressing plate are rotatably connected to each other, and the handle and the base plate are rotatably connected to each other. When the existing tortilla makers are in use, dough is disposed on the base plate, the pressing plate is pressed onto the dough, and the handle is pressed to make the dough form a tortilla.

BRIEF SUMMARY OF THE DISCLOSURE

The present disclosure provides an adjustable tortilla maker to make different thicknesses of tortillas according to needs.

In order to solve the technical problem, a technical solution of the present disclosure is as follows.

An adjustable tortilla maker comprises a base plate, a pressing plate, and a rotary shaft assembly. The base plate comprises a lower forming surface, and the pressing plate comprises an upper forming surface. When the pressing plate is in a pressing state, the lower forming surface is opposite to the upper forming surface. The rotary shaft assembly comprises a rotary shaft seat, a mounting post, a pressing plate pin shaft, and a locking portion. The pressing plate pin shaft is mounted on the rotary shaft seat, and the pressing plate is rotatably connected to the rotary shaft seat through the pressing plate pin shaft. The mounting post is connected to the base plate, and the mounting post extends along a thickness direction of the base plate. The mounting post protrudes from the lower forming surface of the base plate, and the rotary shaft seat is configured to be movably mounted on the mounting post. The locking portion is configured to lock the rotary shaft seat to the mounting post at a predefined position.

In a preferred embodiment, the pressing plate is connected with one or more adjusting members, and the one or more adjusting members are configured to be movably connected to the pressing plate along a thickness direction of the pressing plate. When the pressing plate is in the pressing state, the one or more adjusting members contact the base plate to define a minimum distance between the pressing plate and the base plate.

In a preferred embodiment, the one or more adjusting members and the rotary shaft assembly are located on two sides of the adjustable tortilla maker that are opposite to each other.

In a preferred embodiment, the adjustable tortilla maker comprises one or more gaskets. The one or more adjusting members are one or more screws, and the one or more screws pass through the pressing plate. The one or more gaskets are disposed between head portions of the one or more screws and the pressing plate.

In a preferred embodiment, the adjustable tortilla maker comprises a handle configured to press the pressing plate to the base plate. The one or more adjusting members are two adjusting members spaced apart from each other with the handle disposed therebetween. The two adjusting members are two screws, and one end of each of the two screws passes through the pressing plate and is configured to contact the base plate.

In a preferred embodiment, the adjustable tortilla maker comprises one or more gaskets. The one or more gaskets are disposed between the base plate and the rotary shaft seat, and the one or more gaskets are sleeved on the mounting post.

In a preferred embodiment, the adjustable tortilla maker comprises a handle. The handle is rotatably connected to the base plate, and the pressing plate is disposed with a pressing shaft. The pressing shaft is rotatably connected to the pressing plate. During a process of pressing down of the handle, the handle is configured to contact the pressing shaft to press the pressing plate using the pressing shaft.

In a preferred embodiment, the pressing shaft is disposed on an edge of the pressing plate, and an axis of the pressing shaft is parallel to a rotating axis of the handle.

In a preferred embodiment, the pressing shaft is a roller or a bearing, or the pressing shaft comprises a roller or a bearing. A lower surface of the handle comprises a groove configured to receive a portion of the pressing shaft.

In a preferred embodiment, the mounting post comprises a scale.

In a preferred embodiment, the locking portion is a screw, and the rotary shaft seat comprises a fixing hole. The screw passes through the fixing hole to press the mounting post so as to lock the rotary shaft seat to the mounting post at the predefined position.

In a preferred embodiment, the mounting post is mounted with a nut, and the nut is pressed onto a top of the rotary shaft seat.

In a preferred embodiment, the adjustable tortilla maker comprises a plurality of gaskets with different thicknesses for replacement.

In a preferred embodiment, the one or more gaskets are a plurality of gaskets with different thicknesses for replacement.

In a preferred embodiment, the one or more first gaskets are a plurality of gaskets with different thicknesses for replacement.

By adopting the above technical solution, at least one of the following beneficial effects can be obtained.

The position of the rotary shaft seat on the mounting post can be adjusted according to needs to make different thicknesses of tortillas.

The one or more adjusting members can be adjusted to enable the pressing plate to be parallel to the base plate when the adjustable tortilla maker is in the pressing state so that the raw materials can be evenly pressed to make the tortillas have an even thickness. The adjustable tortilla maker can make one or more tortillas at a time.

Due to a buffering of the pressing shaft, the handle and the pressing plate are not easy to crack or even break.

Due to a guiding of rolling of the pressing shaft, a larger one of the raw materials can be pressed by directly pressing the handle without pressing the pressing plate.

DETAILED DESCRIPTION OF THE EMBODIMENTS

The present disclosure will be further described below in combination with the accompanying drawings and embodiments.

Referring to FIGS. 1-4, an adjustable tortilla maker of the present disclosure is provided and comprises a base plate 1, a pressing plate 2, a rotary shaft assembly 3, a handle 4, and a pressing shaft 5.

The base plate 1 comprises a lower forming surface 11, and the lower forming surface 11 can be a top surface of the base plate 1. The pressing plate 2 comprises an upper forming surface, and the upper forming surface can be a bottom surface of the pressing plate 2. The base plate 1 and the pressing plate 2 are substantially flat-shaped, and the lower forming surface 11 and the upper forming surface are flat surfaces. The pressing plate 2 is configured to be rotatably connected to the base plate 1 through the rotary shaft assembly 3. When the pressing plate 2 is in a pressing state, the lower forming surface 11 is opposite to the upper forming surface.

When the adjustable tortilla maker is in use, raw materials (i.e., dough) are disposed between the lower forming surface 11 and the upper forming surface, and the base plate 1 and the pressing plate 2 move toward each other to flatten the raw materials into a tortilla shape.

The rotary shaft assembly 3 comprises a rotary shaft seat 31, a mounting post 32, a pressing plate pin shaft 33, a bearing 34, a locking portion 35, and a nut 36.

The mounting post 32 is fixedly connected to an outer edge of the base plate 1. Specifically, the mounting post 32 is fixedly connected to a protruding portion 12 of the base plate 1 that protrudes from a substantially round main plate of the base plate 1. The mounting post 32 extends along a thickness direction T and protrudes from the lower forming surface 11 of the base plate 1. The rotary shaft seat 31 comprises a mounting hole 311, the mounting post 32 passes through the mounting hole 311 to make the rotary shaft seat 31 sleeve on the mounting post 32, and the rotary shaft seat 31 can slide along an extending direction (i.e., the thickness direction T) of the mounting post 32.

Figure 3:
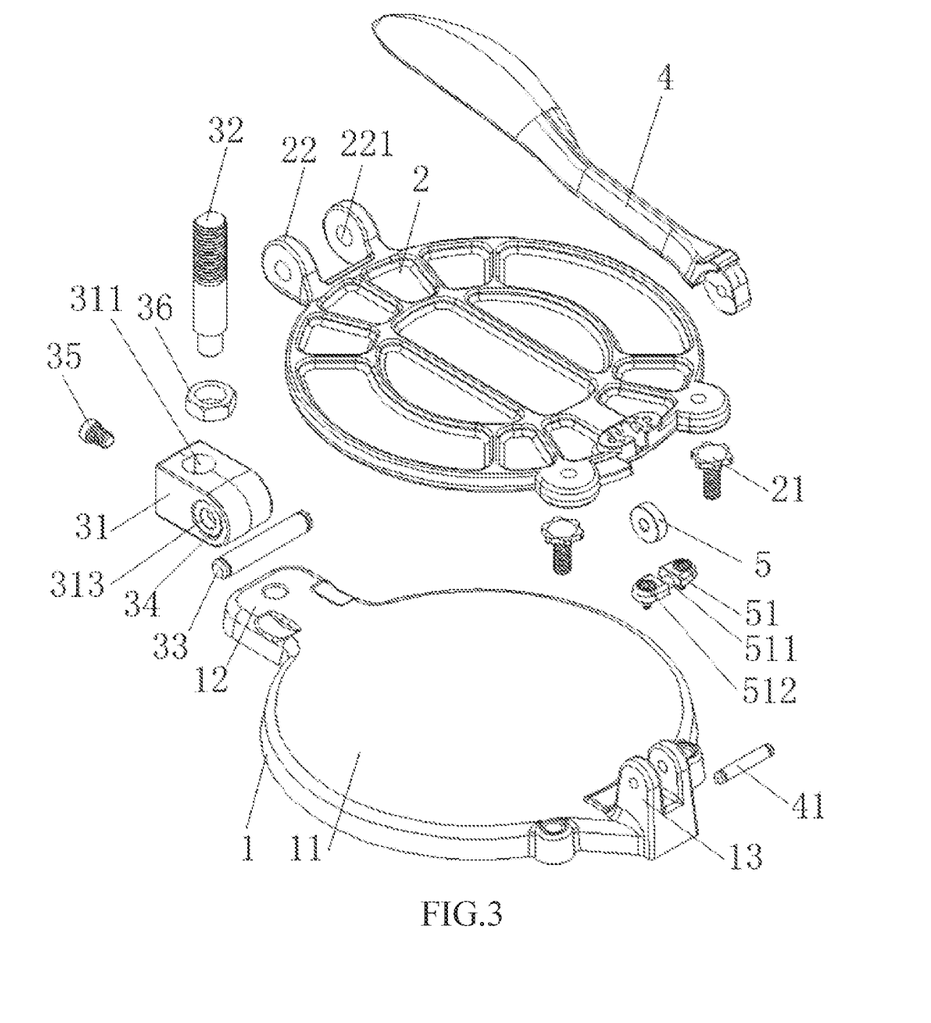
FIG. 3 illustrates an exploded view of the adjustable tortilla maker of the present disclosure.

It should be understood that by saying that the mounting post 32 is fixedly connected to the bottom plate 1 does not mean that the mounting post 32 is completely non-detachably installed on the base plate 1. Instead, saying that the mounting post 32 is fixedly connected to the bottom plate 1 means that during normal use, the mounting post 32 does not need to be removed from the base plate 1 or there is no need to adjust an installation height or location of the mounting post 32. For example, the mounting post 32 may be welded or screwed to the base plate 1.

Figure 4:
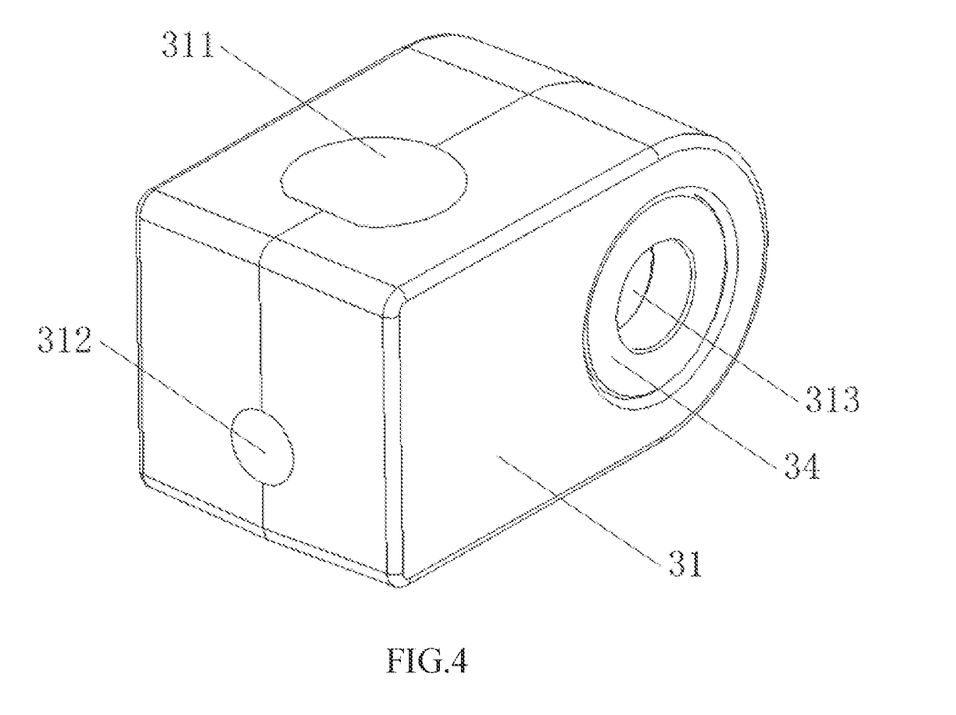
FIG. 4 illustrates a perspective view of a rotary shaft seat and a bearing of the adjustable tortilla maker of the present disclosure.

The pressing plate pin shaft 33 passes through the rotary shaft seat 31 and the pressing plate 2 to enable the pressing plate 2 to be rotatably connected to the rotary shaft seat 31. Specially, the pressing plate pin shaft 33 passes through a first pin shaft hole 313 of the rotary shaft seat 31 and a second pin shaft hole 221 of the pressing plate 2. The second pin shaft hole 221 can be defined in a pair of lugs protruding from a substantially round main body of the pressing plate 2. The bearing 34 is mounted in the first pin shaft hole 313 and is sleeved on the pressing plate pin shaft 33 to make the pressing plate pin shaft 33 smoothly rotate.

The bearing 34 can be a transverse bearing. The first pin shaft hole 313 and the second pin shaft hole 221 extend parallel to the lower forming surface 11. In another words, each of the first pin shaft hole 313 and the second pin shaft hole 221 can extend vertically relative to the mounting hole 311.

The locking portion 35 can lock the rotating shaft seat 31 at a predetermined position of the mounting post 32. Specifically, the rotary shaft seat 31 comprises a fixing hole 312 in communication with the mounting hole 311. The fixing hole 312 is a threaded hole. An axis of the fixing hole 312 may be perpendicular to an axis of the mounting hole 311 and an axis of the first pin shaft hole 313. The locking portion 35 (e.g., a screw) is tightly screwed into the fixing hole 312 to lock the rotary shaft seat 31 to the mounting post 32. When the locking portion 35 is loosened, the rotary shaft seat 31 can slide along the mounting post 32 to adjust a position of the rotary shaft seat 31 on the mounting post 32.

The mounting post 32 can comprises a scale for indicating a distance between the lower forming surface 11 and the upper forming surface, and the distance is equal to a thickness of a tortilla that is made by the adjustable tortilla maker. The position of the rotary shaft seat 31 on the mounting post 32 can be accurately adjusted using the scale, and the rotary shaft seat 31 can be locked in a position, which has been adjusted, on the mounting post 32 by the locking portion 35. By adjusting the position of the rotary shaft seat 31 on the mounting post 32, the distance between the lower forming surface 11 and the upper forming surface can be changed, thereby making tortillas of different thicknesses.

The mounting post 32 comprises threads, and the nut 36 is sleeved on the mounting post 32 and is installed on the mounting post 32 in a threaded fit manner. The nut 36 is located above the rotary shaft seat 31. The nut 36 can not only prevent the rotary shaft seat 31 from lifting when the pressing plate 2 is pressed, but the nut 36 also can be used as a limiting portion to limit the position of the rotary shaft seat 31 so as to accurately position the position of the rotary shaft seat 31 on the mounting post 32.

Figure 6:
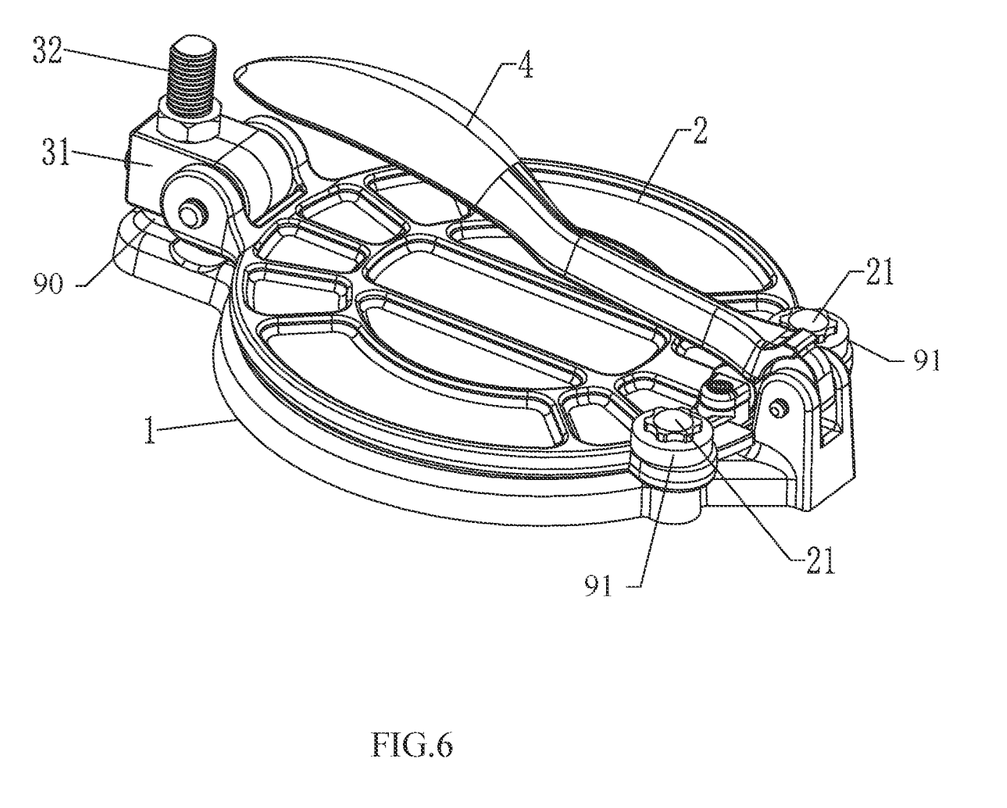
FIG. 6 illustrates a perspective view of the adjustable tortilla maker of the present disclosure, illustrating one or more gaskets.

The adjustable tortilla maker comprises one or more first gaskets 90, and the one or more first gaskets 90 are sleeved on the mounting post 32 and disposed between the base plate 1 and the rotary shaft seat 31. The one or more first gaskets 90 comprise first gaskets 90 have different thicknesses, and the position of the rotary shaft seat 31 on the mounting post 32 can be accurately and conveniently adjusted without observing the scale carefully through selecting one or more of the one or more first gaskets 90 of different thicknesses. In this embodiment, the one or more first gaskets 90 are a plurality of first gaskets 90 having thicknesses of one-sixteenth inch, one-eighth inch, one-sixth inch, one-quarter inch, and three-eighths inch.

For instance, a thicker first gasket 90 of the one or more first gaskets 90 moves the rotary shaft seat 31 farther from the base plate 1 and corresponds to a thick tortilla, and a thinner first gasket 90 of the one or more first gaskets 90 brings the rotary shaft seat 31 closer to the base plate 1 and corresponds to a thin tortilla.

Figure 1:
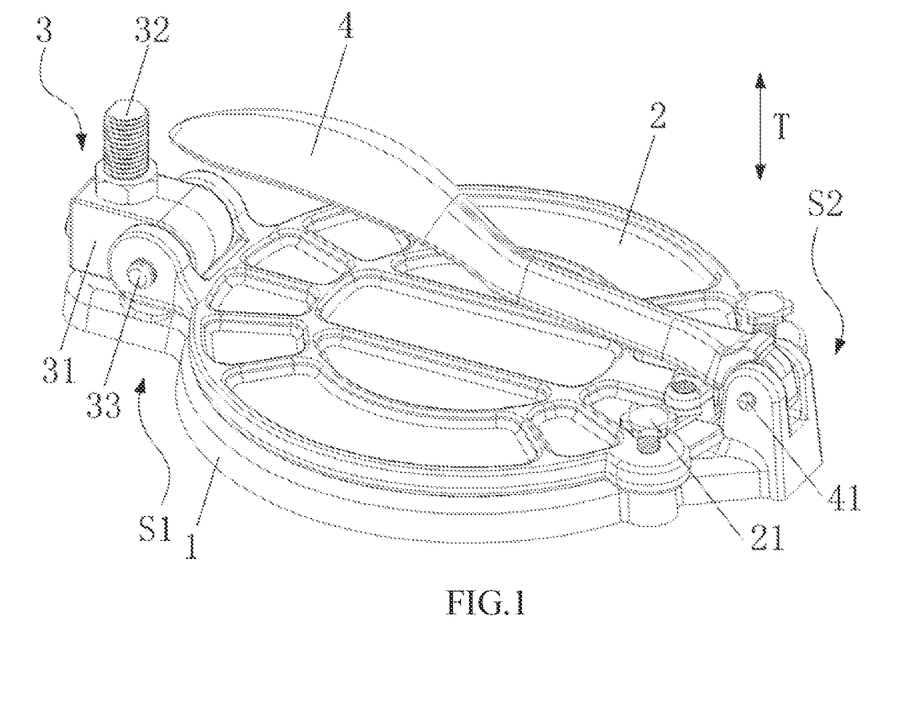
FIG. 1 illustrates a perspective view of an adjustable tortilla maker of the present disclosure.
Figure 2:
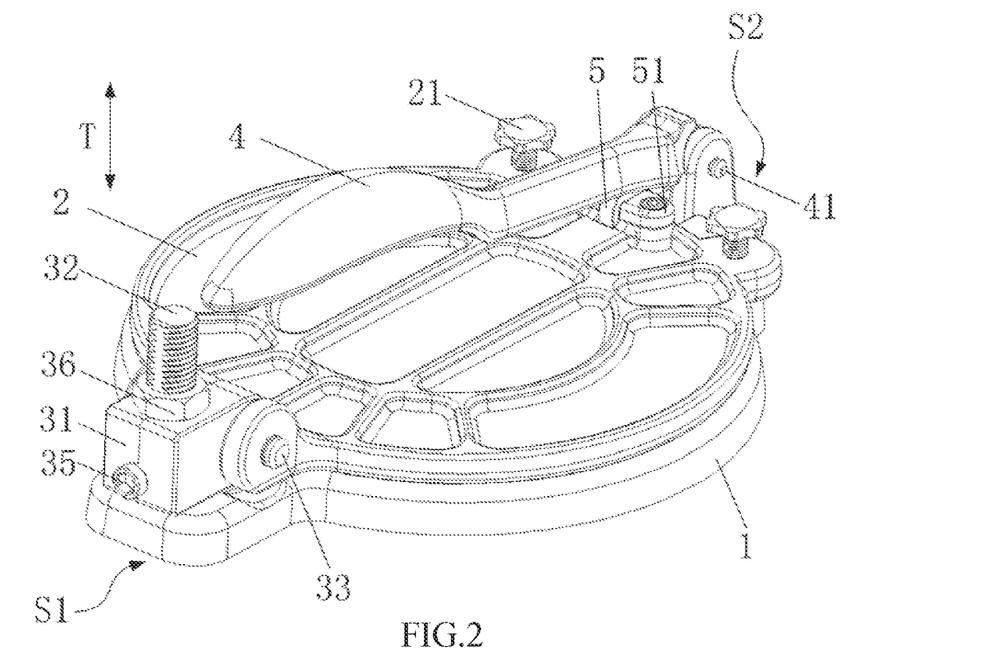
FIG. 2 illustrates a perspective view of the adjustable tortilla maker of the present disclosure.

The handle 4 is rotatably connected to the base plate 1, and a mounted position of the handle 4 is opposite to the rotary shaft seat 31. More specifically, the handle 4 is configured to be rotatably connected to pin holes of a pair of base plate lugs 13 protruding upward from the substantially round main plate of the base plate 1. More specifically, the handle 4 is configured to be rotatably connected to the pin holes of the pair of base plate lugs 13 through a handle pin shaft 41. An axis of the pressing pin shaft 33 can be parallel to an axis of the handle pin shaft 41. The handle 4 and the rotary shaft assembly 3 are located on two sides of the adjustable tortilla maker that are opposite to each other. The handle 4 is configured to swing to apply an external force onto the pressing plate 2 to press the pressing plate 2.

The pressing shaft 5 is rotatably connected to the pressing plate 2 through a pressing shaft accessory 51. In this embodiment, the pressing shaft 5 is connected to a position of an outer edge of a top surface of the pressing plate 2, specially, that is close to the handle pin shaft 41, more specifically, that is an inner position of the pressing plate 2 relative to the handle pin shaft 41 along a radial direction of the handle pin shaft 41, or, that is closer to rotary shaft assembly 3 relative to the handle pin shaft 41. The handle 4 and the pressing shaft 5 define a force intensification lever so as to enable a relatively small force applied to the handle 4 to be intensified to a relatively large force applied to the pressing plate 2. In this embodiment, an axis of the pressing shaft 5 is parallel to the axis of the handle pin shaft 41. During a process of pressing down of the handle 4, the handle 4 can contact the pressing shaft 5, and the pressing shaft 5 can roll on a surface of the handle while the handle 4 and the pressing plate 2 are pressed down. Through the pressing shaft 5 rotating, the handle 4 can be easily pressed down with a relatively small force and has a relatively small friction. When a larger one of the raw materials is pressed and an open angle of the pressing plate 2 is relatively large, the larger one of the raw materials can be pressed directly through the handle 4 being pressed down with a guiding of rolling of the pressing shaft 5, and there is no need to press the pressing plate 2 while the handle 4 is pressed down.

Due to the rotating of the pressing shaft 5 enabling the handle 4 to be easily pressed down, a relatively small force applied to the handle 4 corresponds to a relatively small force between the handle 4 and the pressing plate 2 while contacting each other. As a result, the handle 4 and the pressing plate 2 are not easy to crack or even break.

Figure 5:
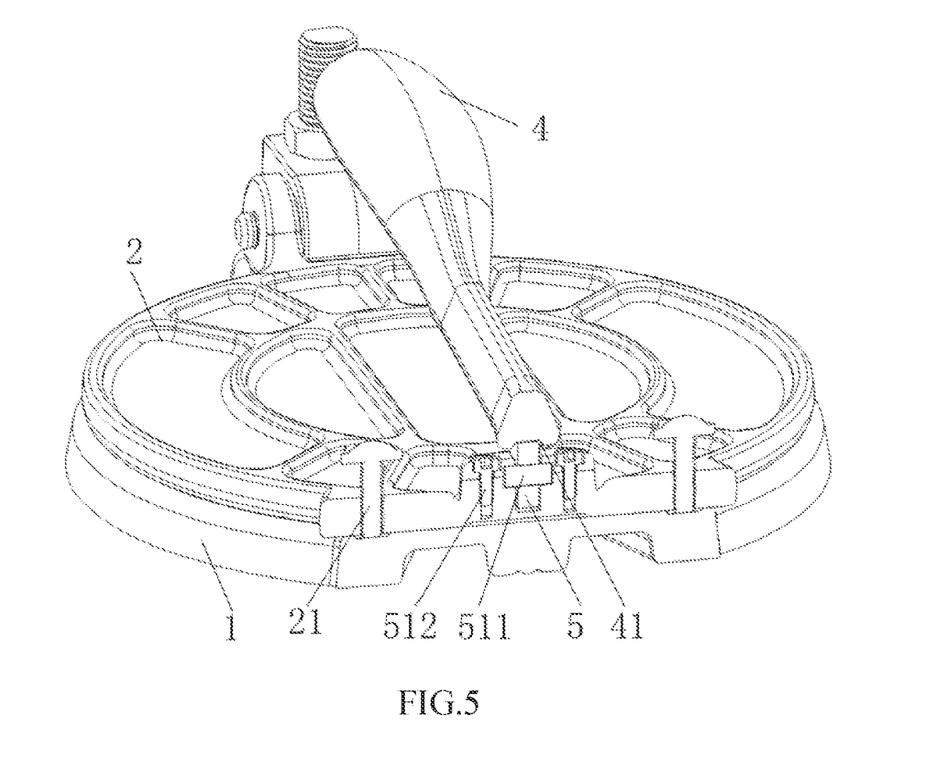
FIG. 5 illustrates a cross-sectional, perspective view of the adjustable tortilla maker of the present disclosure.

Specifically, referring to FIG. 5, the pressing shaft accessory 51 comprises a shaft 511, and two ends of the shaft 511 are mounted to the pressing plate 2 through screws 512. The pressing shaft 5 is a roller or a bearing, or comprises a roller or a bearing, and the pressing shaft 5 is sleeved on the shaft 51. The shaft 51 extends parallel to the handle pin shaft 41. A lower surface of the handle 4 comprises a groove configured to receive a portion of the pressing shaft 5 to enable the handle 4 to be pressed tightly to the pressing shaft 5, and the handle 4 and the pressing shaft 5 are not easily misaligned to make the process of pressing down of the handle 4 work more smoothly.

The pressing plate 2 is connected with one or more adjusting members 21. The one or more adjusting members 21 are movably connected to the pressing plate 2 along the thickness direction T of the pressing plate 2, and at least part of a structure of the adjusting member 21 protrudes from the upper forming surface of the pressing plate 2. When the pressing plate 2 presses the raw materials, the one or more adjusting members 21 can contact the base plate 1 to make the pressing plate 2 stop pressing downward.

In this embodiment, the one or more adjusting members 21 are screws that pass through the pressing plate 2 from up to down (i.e., top to bottom). End portions of the screws, which move through the pressing plate 2, contact the base plate 1 to define a minimum distance between the pressing plate 2 and the base plate 1 (i.e., a minimum distance between the upper forming surface and the lower forming surface 11). By adjusting a screwing degree of the screws, a protruding length of a portion, which protrudes from the upper forming surface of the pressing plate 2, of the screws can be adjusted to correspondingly adjust the distance between the lower forming surface 11 and the upper forming surface.

Referring to FIG. 5, the base plate 1 comprises a recess for supporting or receiving end portions, which move through the pressing plate 2, of the one or more adjusting members 21. In this embodiment, the one or more adjusting members 21 are a pair of adjusting members 21, and the pair of adjusting members 21 is spaced apart from each other with the handle 4 disposed therebetween.

In a preferred embodiment, one or more second gaskets 91 is provided and disposed between head portions of the screws and the pressing plate 2. For difference lengths of the screws, the protruding length of the portion of the screws can be adjusted by using different thicknesses of second gaskets 91 of the one or more second gaskets 91 so that when the adjustable tortilla maker is in the pressing state, the pressing plate 2 is parallel to the base plate 1 to evenly press the raw materials between the base plate 1 and the pressing plate 2 to obtain a tortilla with uniform thickness. Specifically, a thickness of a first tortilla close to the rotary shaft seat 31 is equal to a thickness of a second tortilla close to the one or more adjusting members 21, or a thickness of a first portion, which is close to the rotary shaft seat 31, of a tortilla is equal to a thickness of a second portion, which is close to the one or more adjusting members 21, of the tortilla.

For instance, when using a thicker second gasket 91 of the one or more second gaskets 91, the protruding length of the portion of the screws is shorter, the distance between the lower forming surface 11 and the upper forming surface is smaller, and the tortillas made by the adjustable tortilla maker are thinner. When using a thinner second gasket 91 of the second set of the one or more second gaskets 91, the protruding length of the portion of the screws is longer, the distance between the lower forming surface 11 and the upper forming surface is larger, and the tortillas made by the adjustable tortilla maker are thicker.

The one or more adjusting members 21 and the rotary shaft assembly 3 are located on the two sides of the adjustable tortilla maker that are opposite to each other.

The rotary shaft seat 31, that is located at a first end S1 of the adjustable tortilla maker, can be adjusted based on the position on the mounting post 21 so as to adjust a first distance between the upper forming surface and the lower forming surface 11 at the first end S1 of the adjustable tortilla maker to make different thicknesses of tortillas.

The protruding length of the portion of the one or more adjusting members 21, that are located at a second end S2 of the adjustable tortilla maker, can be adjusted so as to adjust a second distance between the upper forming surface and the lower forming surface 11 at the second end S2 of the adjustable tortilla maker to make different thicknesses of tortillas.

The first end S1 and the second end S2 of the adjustable tortilla maker are adjusted to adjust the distance of the upper forming surface and the lower forming surface 11 so as to enable the upper forming surface and the lower forming surface 11 to be parallel to each other, enable the raw materials to be evenly pressed, and make the tortillas pressed from the raw materials have an even thickness.

By adopting the above technical solution, at least one of the following beneficial effects can be obtained.

The position of the rotary shaft seat 31 on the mounting post 32 can be adjusted according to needs to make different thicknesses of tortillas.

The one or more adjusting members 21 can be adjusted to enable the pressing plate 2 to be parallel to the base plate 1 when the adjustable tortilla maker is in the pressing state so that the raw materials can be evenly pressed to make the tortillas have an even thickness.

Due to a buffering of the pressing shaft 5, the handle 4 and the pressing plate 2 are not easy to crack or even break.

Due to a guiding of rolling of the pressing shaft 5, a larger one of the raw materials can be pressed by directly pressing the handle 4 without pressing the pressing plate 2.

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:

1. An adjustable tortilla maker, comprising:
   a base plate,
   a pressing plate,
   one or more first gaskets, and
   a rotary shaft assembly, wherein:
      the base plate comprises a lower forming surface,
      the pressing plate comprises an upper forming surface,
      the rotary shaft assembly comprises a rotary shaft seat, a mounting post, a pressing plate pin shaft, and a locking portion,
      the pressing plate pin shaft is mounted on the rotary shaft seat,
      the pressing plate is rotatably connected to the rotary shaft seat through the pressing plate pin shaft,
      the mounting post is connected to the base plate,
      the mounting post extends along a thickness direction of the base plate,
      the mounting post protrudes from the lower forming surface of the base plate,
      the rotary shaft seat is configured to be movably mounted on the mounting post,
      the locking portion is configured to lock the rotary shaft seat to the mounting post at a predefined position,
      the one or more first gaskets are disposed between the base plate and the rotary shaft seat,
      the one or more first gaskets are sleeved on the mounting post, and
      when the pressing plate is in a pressing state, the lower forming surface is opposite to the upper forming surface.

2. The adjustable tortilla maker according to claim 1, wherein:
   the pressing plate is connected with one or more adjusting members,
   the one or more adjusting members are configured to be movably connected to the pressing plate along a thickness direction of the pressing plate, and
   when the pressing plate is in the pressing state, the one or more adjusting members contact the base plate to define a minimum distance between the pressing plate and the base plate.

3. The adjustable tortilla maker according to claim 2, wherein:
   the one or more adjusting members and the rotary shaft assembly are located on two sides of the adjustable tortilla maker that are opposite to each other.

4. The adjustable tortilla maker according to claim 2, comprising:
   a handle configured to press the pressing plate to the base plate, wherein:
      the one or more adjusting members are two adjusting members spaced apart from each other with the handle disposed therebetween,
      the two adjusting members are two screws, and
      one end of each of the two screws passes through the pressing plate and is configured to contact the base plate.

5. The adjustable tortilla maker according to claim 2, wherein:
   the one or more first gaskets are a plurality of first gaskets having different thicknesses for replacement.

6. The adjustable tortilla maker according to claim 2, one or more second gaskets, wherein:
   the one or more adjusting members are one or more screws,
   the one or more screws pass through the pressing plate, and
   the one or more second gaskets are disposed between head portions of the one or more screws and the pressing plate.

7. The adjustable tortilla maker according to claim 6, wherein:
   the one or more first gaskets are a plurality of first gaskets having different thicknesses for replacement, and
   the one or more second gaskets are a plurality of second gaskets having different thicknesses for replacement.

8. The adjustable tortilla maker according to claim 1, comprising:
   a handle, wherein:
      the handle is rotatably connected to the base plate,
      the pressing plate is disposed with a pressing shaft,
      the pressing shaft is rotatably connected to the pressing plate, and
      during a process of pressing down of the handle, the handle is configured to contact the pressing shaft to press the pressing plate using the pressing shaft.

9. The adjustable tortilla maker according to claim 8, wherein:
   the pressing shaft is disposed on an edge of the pressing plate, and
   an axis of the pressing shaft is parallel to a rotating axis of the handle.

10. The adjustable tortilla maker according to claim 8, wherein:
    the pressing shaft is a roller or a bearing, or the pressing shaft comprises a roller or a bearing, and
    a lower surface of the handle comprises a groove configured to receive a portion of the pressing shaft.

11. The adjustable tortilla maker according to claim 1, wherein:
    the mounting post comprises a scale.

12. The adjustable tortilla maker according to claim 1, wherein:
    the locking portion is a screw, the rotary shaft seat comprises a fixing hole, and the screw passes through the fixing hole to press the mounting post so as to lock the rotary shaft seat to the mounting post at the predefined position.

13. The adjustable tortilla maker according to claim 1, wherein:

the mounting post is mounted with a nut, and the nut is pressed onto a top of the rotary shaft seat.

14. The adjustable tortilla maker according to claim 1, wherein the one or more first gaskets are a plurality of first gaskets having different thicknesses for replacement.

15. An adjustable tortilla maker, comprising:

a base plate, a pressing plate, a handle configured to press the pressing plate to the base plate, and a rotary shaft assembly, wherein:

the base plate comprises a lower forming surface, the pressing plate comprises an upper forming surface, the rotary shaft assembly comprises a rotary shaft seat, a mounting post, a pressing plate pin shaft, and a locking portion, the pressing plate pin shaft is mounted on the rotary shaft seat, the pressing plate is rotatably connected to the rotary shaft seat through the pressing plate pin shaft, the mounting post is connected to the base plate, the mounting post extends along a thickness direction of the base plate, the mounting post protrudes from the lower forming surface of the base plate, the rotary shaft seat is configured to be movably mounted on the mounting post, the locking portion is configured to lock the rotary shaft seat to the mounting post at a predefined position, the pressing plate is connected with one or more adjusting members, the one or more adjusting members are configured to be movably connected to the pressing plate along a thickness direction of the pressing plate, the one or more adjusting members are two adjusting members spaced apart from each other with the handle disposed therebetween, the two adjusting members are two screws, one end of each of the two screws passes through the pressing plate and is configured to contact the base plate, and when the pressing plate is in a pressing state:

the lower forming surface is opposite to the upper forming surface, and the one or more adjusting members contact the base plate to define a minimum distance between the pressing plate and the base plate.

16. An adjustable tortilla maker, comprising:

a base plate, a pressing plate, one or more gaskets, and a rotary shaft assembly, wherein:

the base plate comprises a lower forming surface, the pressing plate comprises an upper forming surface, the rotary shaft assembly comprises a rotary shaft seat, a mounting post, a pressing plate pin shaft, and a locking portion, the pressing plate pin shaft is mounted on the rotary shaft seat, the pressing plate is rotatably connected to the rotary shaft seat through the pressing plate pin shaft, the mounting post is connected to the base plate, the mounting post extends along a thickness direction of the base plate, the mounting post protrudes from the lower forming surface of the base plate, the rotary shaft seat is configured to be movably mounted on the mounting post, the locking portion is configured to lock the rotary shaft seat to the mounting post at a predefined position, the pressing plate is connected with one or more adjusting members, the one or more adjusting members are configured to be movably connected to the pressing plate along a thickness direction of the pressing plate, the one or more adjusting members are one or more screws, the one or more screws pass through the pressing plate, the one or more gaskets are disposed between head portions of the one or more screws and the pressing plate, and when the pressing plate is in a pressing state:

the lower forming surface is opposite to the upper forming surface, and the one or more adjusting members contact the base plate to define a minimum distance between the pressing plate and the base plate.

* * * * *